United States Patent Office 3,455,710
Patented July 15, 1969

3,455,710
WATER REPELLENT MASONRY ARTICLES
Siegfried Nitzsche, Ewald Heinrich Pirson, and Michael Roth, Burghausen, Upper Bavaria, Germany, assignors to Wacker-Chemie G.m.b.H., Munich, Bavaria, Germany
No Drawing. Filed Aug. 27, 1965, Ser. No. 483,320
Claims priority, application Germany, Sept. 4, 1964, W 37,499
Int. Cl. C04b *11/14*
U.S. Cl. 106—111  5 Claims

ABSTRACT OF THE DISCLOSURE

Masonry articles formed by standard techniques employing gypsum materials are rendered water repellent by incorporating into the gypsum material an aqueous emulsion of an organohydrogenpolysiloxane.

---

This invention relates to a method of preparing water repellent molded articles and coatings of inorganic compounds which are formed by adding water thereto and are cured by allowing the water to evaporate therefrom.

A wide variety of gypsum compounds and similar inorganic materials are widely known for use with water to produce molded articles and/or coatings. The ultimate products obtained from such gypsum-water systems have suffered from the water solubility of the base material and the use of additives therewith has been severely restricted because of the water absorption and solubility of the gypsum. It has been suggested to reduce the water sensitivity of such products by employing hydrophobizing organosilicon compounds. The organosilicon compounds may be added to the water-hardening gypsum materials before molding or they may be coated onto the molded product. However, the degree of water repellency and water resistance attained with the organosilicon compounds heretofore employed has not been satisfactory. The alkaline metal organosiliconates have also been tried and have also been found to be unsatisfactory because they can be washed out before their effectiveness is fully developed and they will often lead to efflorescence.

It is an object of this invention to provide a method for preparing water repellent molded articles and coatings from inorganic water hardenable materials such as gypsum. Another object is a water resistant and water repellent gypsum or gypsum-like construction material. Other objects and advantages of this invention are detailed in or will be apparent from the disclosure and claims.

This invention comprises admixing an inorganic material which will harden when water is added with an aqueous emulsion of an organosiloxane polymer containing 2 to 100 mol percent of units of the general formula

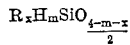

where each R is an alkyl radical of less than 5 carbon atoms, $x$ is 0, 1 or 2 and has an average value in the range 0.7 to 1.3, $m$ is 1, 2 or 3 and the sum of $m+x$ is 1, 2 or 3 and 0 to 98 mol percent of units of the general formula

wherein R is as defined above and $n$ is 0, 1, 2 or 3 and has an average value of 0.9 to 1.8, the siloxane polymer having an H/Si ratio in the range from 0.02/1 to 1.25/1.

The organosiloxane polymers employed herein are more properly designated as organohydrogensiloxane polymers and copolymers. The organic radicals bonded to Si through C—Si bonding are selected from methyl, ethyl, n-propyl, isopropyl, n-butyl and sec-butyl radicals. Different radicals can be bonded to silicon in different units in the polymer as in a copolymer containing methyl siloxane units and ethylsiloxane units or each Si can have two or three different radicals bonded thereto as in a methylethylsiloxane or all of the radicals can be a single species as in a methylsiloxane polymer. However, it is preferred that at least 80 percent of the R radicals are methyl radicals. Although the organic radical/silicon ratio (R/Si) in the operative polymers can vary from 0/1 to about 2/1, it is preferred to employ polymers having an R/Si ratio in the range from 0.9/1 to 1.0/1. Similarly, although the operable range of H/Si is from 0.02/1 to 1.25/1 in the polymer, it is preferred to employ an organohydrogensiloxane having an H/Si in the range 0.9/1 to 1.2/1 and the siloxane units free of hydrogen, i.e.

preferably have an R/Si ratio of from 0.9/1 to 1.2/1. In the entire siloxane polymer mass the H/Si ratio is preferably from 0.1/1 to 1.0/1.

The operable siloxane polymers can be copolymers of siloxane units free of HSi and siloxane units containing HSi, such as

where $a$, $b$, $c$, $d$ and $e$ are integers or 0. Other operable siloxane polymers include mixtures of organosiloxanes essentially free of HSi and having an R/Si ratio of 0.8/1 to 1.8/1 and organohydrogensiloxanes having hydrogen bonded to essentially all of the silicon atoms present, such as a mixture of (1) a copolymer of $R_2SiO$ units and $RSiO_{3/2}$ units and (2) $R_3SiO[RHSiO]_aSiR_3$. The mixtures of hydrogen-free siloxanes and organohydrogen siloxanes are advantageous because they are readily obtained on a commercial scale and it is easy to establish specific ratios of H/Si and R/Si in such mixtures.

It is preferred to employ resinous siloxane polymers herein. Accordingly, it is preferred that not more than 25 mol percent of the siloxane units present be of the formulae $R_2SiO$ and $R_3SiO_{1/2}$. Further, the viscosity of the siloxane polymers, which is a measure of its degree of polymerization and cross-linking, is preferably less than 2500 cs. at 25° C. when measured in a 50 percent by weight solution in toluene, with best results achieved with polymers having viscosities below 1,000 cs. at 25° C. when measured in a 50% toluene solution.

The siloxane polymers employed herein are used in the form of aqueous emulsions. Accordingly, some of the silicon atoms present may be substituted with OH groups and/or —OR groups. This is especially true of those siloxane polymers which are free of hydrogen bonded to silicon. In any case, the siloxane polymers are prepared by standard and well-known procedures involving hydrolysis of appropriate mixtures of halogenosilanes and/or alkoxy silanes (e.g.

The siloxane polymer is incorporated in an aqueous emulsion by known procedures employing colloid mills and other standard techniques. Generally an emulsifying agent (i.e. a surface active agent) is employed in the emulsions. Those emulsifying agents generally employed with organosiloxane emulsions can be employed herein. Examples of operable emulsifying agents include protective colloids such as polyvinyl alcohol, which may contain up to 40 mol percent acetyl groups, gelatines, organic gums, and cellulose derivatives such as water soluble methyl cellulose; anionic emulsifying agents such as alkali metal and ammonuim salts of long chain fatty acids, organic sulfonic acids and acidic sulfuric acid esters, e.g. sodium laurate, sodium isopropylnaphthaline sulfonate, sodium dioctylsulfosuccinate, triethanol ammonium oleate, sodium lauryl alcohol sulfonate, and corresponding potassium, lithium, rubidium and cesium compounds; cationic emulsifying agents such as stearyl ammonium chloride; and nonionic emulsifying agents such as polyoxyethylene ethers and sorbitan monolaurate ethers of mono- or polyhydric aliphatic alcohols or aromatic hydroxy compounds. The exact nature of the emulsifying agent is not critical. However, the non-ionic emulsifying agents are preferred. The emulsifying agent is employed in proportions of from 0.1 to 5 percent by weight based on the weight of siloxane polymer present.

The emulsions employed herein can be prepared in any desired manner employing the siloxane as a solvent-free fluid or dissolved in a normally fluid, organic solvent. The use of an organic solvent is preferred. Operable solvents include aliphatic and aromatic hydrocarbons, e.g. benzine fractions in the boiling range 130°–220° C., toluene and xylene; chlorohydrocarbons such as trichlorethylene and perchlorethylene; esters such as methyl acetate; ethers such as di-n-butyl ethers, and ketones such as methylethylketone. The organic solvent is preferably employed in proportions of from 25 to 75 percent by weight based on the weight of siloxane polymer employed. The emulsion of siloxane polymer contains from 0.001 to 50 percent by weight of the siloxane polymer.

The presence of hydrogen on the siloxane molecule results in some hydrogen evolution during storage. Accordingly, a small proportion of acetic acid or other organic acid, aldehyde such as acetaldehyde or other known hydrogen evolution suppressant can be incorporated in the siloxane emulsions to good advantage.

The inorganic materials which will harden when water is added can include a wide variety of materials but gypsum, gypsum derivatives and gypsum-like materials are most commonly employed herein. These hardenable materials may be acidic, neutral or basic in nature but the preferred materials have a pH below 7.5 in the aqueous system prior to hardening. Gypsum satisfies this pH preference and because of their sensitivity to water articles of gypsum are most advantageously treated herein.

In contrast to many cementitious materials such as portland cement, which is water stable, i.e. a hydraulic bonding material, gypsum is not water stable, i.e. it is a non-hydraulic bonding agent. It is indeed surprising that the hydrogensiloxanes are effective as hydrophobizing agents on gypsum in contrast to the known organosiloxanes because the slightly acidic or neutral nature of gypsum in water would not liberate the hydrogen bonded to silicon nor would it catalyze the condensation of HOSi≡ groups thus formed.

Among the varieties of gypsum employed herein the preferred one is plaster ($CaSO_4 \cdot \frac{1}{2}H_2O$) in the form of building plaster, plaster of Paris, or insulating plaster. If desired, the method of this invention can be carried out with other types of gypsum such as estrich gypsum, marble-plaster, anhydrite and mixtures of plaster and slaked lime. The gypsum can contain commonly employed additives such as sulfate stimulants, liquifiers such as sulfur lixiviators, dyes, pigments, setting retardants, fillers or reinforcing materials such as sand, wood fibers, synthetic fibers, asbestos fibers, expanded mica, expanded lava or pore formers. In addition to the gypsum materials, bonding agents based on magnesium oxide or magnesium chloride can be employed (e.g. sorel cement), lime (CaO), portland cement, and alumina cement $$(CaO \cdot Al_2O_3).$$

The siloxane polymers employed herein can also be applied with advantage to other inorganic materials which are employed in water systems with additives and admixtures commonly employed in processing them to mortar or construction elements such as brick, synthetic stone, concrete blocks and slabs, and wall plates. Such admixtures are primarily sand, sawdust and excelsior.

The preparation of molded articles and coatings from the inorganic materials which will harden when water is added has been well known for a long time. The methods of preparation employed herein do not differ from the previously employed methods except that the emulsion of siloxane polymers described above is added to the mixture prior to hardening.

It is preferred to add from 0.001 to 10 percent by weight, particularly 0.02 to 2 percent, of the organosiloxane polymer based on the weight of inorganic material which will harden when water is added. The siloxane emulsion is added to the inorganic material before it is molded or otherwise formed. The siloxane emulsion can be added to the water employed to mix the hardenable material or the siloxane emulsion can be diluted out with water to form the entire water mass required for mixing the gypsum, mortar or other material. The concurrent use of hardening catalysts is not necessary and such catalysts are preferably not employed in the hardenable masses of the present invention.

The water repellency of the additives employed in accordance with this invention is discernible immediately upon hardening of the gypsum or other inorganic material. Deleterious effects on the ultimate product resulting from the additives employed according to this invention insofar as flexural strength, compressive strength, and so forth, have not been observed.

The following examples are included herein to assist those skilled in the art to gain a full understanding of the invention and to practice the invention. The scope of the invention is delineated in the appended claims and is not limited by the specific embodiments set forth as examples. All parts and percentages are based on weight unless otherwise stated. All viscosities were measured at 25° C. and all temperatures are measured on the centigrade scale.

EXAMPLE 1

Emulsion A is prepared as follows: 80 g. of a fluid organopolysiloxane consisting of about 80 mol percent monomethylsiloxane and 20 mol percent dimethylsiloxane units with 8 percent by weight ethoxy groups and 6 percent by weight of Si-bonded hydroxyl groups as well as 20 g. of a methyl hydrogen polysiloxane with a viscosity of 25 cs./25° C. obtained by pouring a 30 percent by weight solution of methyldichlorosilane ($CH_3SiHCl_2$) in toluene into the five-fold quantity by weight of water and distilling off the toluene from the organic layer, are dissolved in 100 g. toluene. This solution is emulsified in 299 g. water, which has been mixed with 1 g. of a commercially available emulsifier, nonylphenylpolyoxyethylene ether.

An Emulsion B is prepared in the same manner for purposes of comparison, using 100 g. of the above resin of monomethylsiloxane and dimethylsiloxane units free of Si-bonded hydrogen instead of the above organopolysiloxane mixture of 80 g. organopolysiloxane without Si-bonded hydrogen and 20 g. organopolysiloxane with Si-bonded hydrogen.

50 g. of building gypsum (building gypsum is prepared by heating naturally occurring gypsum, $$CaSO_4 \cdot 2H_2O$$

to 180° to 700° C.) are mixed with 35 g. of a mixture of water and various quantities of Emulsions A and B. The mixtures thus obtained are poured into lead cups. After one hour the water repellency of the gypsum slabs thus obtained is measured from the rate of penetration of water droplets of 0.5 ml. each. The following results are obtained.

TABLE I

| Emulsion | Wt. percent emulsion based on dry gypsum | Rate of penetration in seconds |
|---|---|---|
| Control | 0.0 | 6 |
| A | 0.5 | 5,400 |
| A | 1.0 | 7,380 |
| A | 2.0 | 11,880 |
| A | 4.0 | 16,980 |
| B | 1.0 | 13 |
| B | 2.0 | 15 |
| B | 4.0 | 78 |

EXAMPLE 2

An emulsion is prepared in the manner described in Example 1 for Emulsion A, with the exception that instead of 80 g. of Si-bonded hydrogen-free organopolysiloxane, 60 g. of this resin are used and instead of 20 g. of methylhydrogen polysiloxane, 40 g. of methyl hydrogen polysiloxane are used. The preparation of gypsum slabs and testing of the water repellency of the slabs is carried out as described in Example 1. The following results are obtained.

Table II

| Weight percent emulsion based on dry gypsum: | Rate of penetration in seconds |
|---|---|
| 0 (control) | 7 |
| 0.2 | 168 |
| 2.0 | 19,500 |

EXAMPLE 3

An emulsion is prepared in the manner described in Example 1 for Emulsion A, with the exception that instead of using 80 g. organopolysiloxane free of Si-bonded hydrogen, 90 g. of this resin are used and instead of 20 g. of methyl hydrogen polysiloxane, 10 g. of methyl hydrogen polysiloxane are used. The preparation of slabs of gypsum and the testing of the water repellency of the slabs is carried out as described in Example 1. The following results are obtained.

Table III

| Weight percent emulsion based on dry gypsum: | Rate of penetration in seconds |
|---|---|
| 0 (control) | 7 |
| 0.2 | 28 |
| 2.0 | 3,420 |

That which is claimed is:

1. A process for producing water resistant articles from gypsum materials which will harden when water is added thereto comprising incorporating therein 0.001 to 10 percent by weight based on the gypsum material present of an aqueous emulsion containing a fluid organosiloxane polymer having a viscosity below 2500 cs. at 25° C. when measured in a 50% by weight solution in toluene containing 2–100 mol percent of units of the general formula

where each R is an alkyl radical of less than 5 carbon atoms, $x$ is 0, 1 or 2 and has an average value in the polymer of from 0.7–1.3 inclusive, $m$ is 1, 2 or 3 and the sum of $m$ and $x$ is 1, 2 or 3 and 0–98 mol percent of units of the general formula

wherein R is as defined above and $n$ is 0, 1, 2 or 3 and has an average value in the polymer of 0.9 to 1.8, the siloxane polymer having an H/Si ratio of from 0.02/1 to 1.25/1.

2. The process of claim 1 wherein the gypsum material employed is selected from the group consisting of plaster, plaster of Paris and insulating plaster.

3. The process of claim 1 wherein the siloxane employed is a fluid methylhydrogensiloxane.

4. The process of claim 1 wherein the siloxane employed is a mixture of a fluid methylsiloxane resin having a $CH_3/Si$ ratio of from 0.9/1 to 1.2/1 and a fluid methylhydrogen siloxane having a $CH_3/Si$ ratio of about 0.9/1 to 1.0/1 and an H/Si ratio of about 0.9/1 to 1.2/1.

5. The process of claim 1 wherein the siloxane is dispersed in an organic solvent prior to emulsification.

References Cited

UNITED STATES PATENTS

| | | | |
|---|---|---|---|
| 3,058,936 | 10/1962 | Leclerg et al. | 260—29.207 |
| 3,223,665 | 12/1965 | Eder | 260—29.207 |
| 3,086,953 | 4/1963 | Nitzsche et al. | 106—111 |
| 3,318,839 | 5/1967 | Weissbach | 106—111 |

FOREIGN PATENTS

| | | |
|---|---|---|
| 782,111 | 9/1957 | Great Britain. |
| 873,804 | 7/1961 | Great Britain. |
| 873,805 | 7/1961 | Great Britain. |

JAMES E. POER, Primary Examiner

U.S. Cl. X.R.

106—314